(12) United States Patent
Bidmead et al.

(10) Patent No.: US 11,867,206 B2
(45) Date of Patent: Jan. 9, 2024

(54) METHOD OF REMOVING HYDRAULIC FLUID FROM AN AIRCRAFT HYDRAULIC SYSTEM, AN AIRCRAFT HYDRAULIC SYSTEM, AND AN AIRCRAFT

(71) Applicant: Airbus Operations Limited, Bristol (GB)

(72) Inventors: Ashley Bidmead, Bristol (GB); Alexander Hayes, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/769,167

(22) PCT Filed: Oct. 12, 2020

(86) PCT No.: PCT/EP2020/078529
§ 371 (c)(1),
(2) Date: Apr. 14, 2022

(87) PCT Pub. No.: WO2021/074045
PCT Pub. Date: Apr. 22, 2021

(65) Prior Publication Data
US 2023/0126930 A1   Apr. 27, 2023

(30) Foreign Application Priority Data

Oct. 15, 2019 (GB) ..................... 1914918
Mar. 19, 2020 (GB) ..................... 2003960

(51) Int. Cl.
*F15B 21/00* (2006.01)
*B64C 25/42* (2006.01)
(Continued)

(52) U.S. Cl.
CPC ............ *F15B 21/005* (2013.01); *B64C 25/42* (2013.01); *F15B 21/02* (2013.01); *F16K 17/30* (2013.01);
(Continued)

(58) Field of Classification Search
CPC ................... B64C 25/42; F15B 13/023; F15B 2013/0409; F15B 21/005; F15B 21/02;
(Continued)

(56) References Cited

U.S. PATENT DOCUMENTS 2,410,984 A * 11/1946 Lawless ............. F22B 37/42
137/553
5,088,529 A   2/1992 Jones et al.
(Continued)

FOREIGN PATENT DOCUMENTS

CN   108349471   7/2018
EP   0 265 761   5/1988

OTHER PUBLICATIONS

International Search Report and Written Opinion of the International Searching Authority for PCT/EP2020/078529, dated Jan. 20, 2021, 10 pages.
(Continued)

*Primary Examiner* — Kenneth Bomberg
*Assistant Examiner* — Matthew Wiblin
(74) *Attorney, Agent, or Firm* — Nixon & Vanderhye P.C.

(57) ABSTRACT

A method of removing hydraulic fluid from an aircraft hydraulic system is disclosed including a hydraulically actuated mechanism that is actuated by an electrohydraulic servo valve, a hydraulic fluid port through which hydraulic fluid can escape, and a hydraulic fuse with a closed state and an open state between the electrohydraulic servo valve and the hydraulic fluid port. The hydraulic fluid port is opened, and then the activation of the electrohydraulic servo valve is
(Continued)

controlled to force hydraulic fluid to escape from the hydraulic system via the hydraulic fluid port, the control being so that the hydraulic fuse does not enter and remain in the closed state.

20 Claims, 10 Drawing Sheets

(51) Int. Cl.
    *F15B 21/02*     (2006.01)
    *F16K 17/34*     (2006.01)
    *F16K 17/30*     (2006.01)
    *F15B 21/044*     (2019.01)

(52) U.S. Cl.
    CPC ............ *F16K 17/34* (2013.01); *F15B 21/044* (2013.01); *F15B 2211/40576* (2013.01); *F15B 2211/41572* (2013.01); *F15B 2211/426* (2013.01); *F15B 2211/45* (2013.01)

(58) Field of Classification Search
    CPC ........ F15B 21/044; F15B 21/12; F16K 17/30; F16K 17/34
    See application file for complete search history.

(56) References Cited

U.S. PATENT DOCUMENTS

| | | | |
|---|---|---|---|
| 5,507,466 A | * | 4/1996 | Yowell ............... F16K 17/30 |
| | | | 137/271 |
| 5,641,003 A | | 6/1997 | Rey et al. |
| 6,193,031 B1 | | 2/2001 | Baechle et al. |
| 6,193,326 B1 | | 2/2001 | Ybert |
| 6,796,339 B1 | * | 9/2004 | Petty ................... B60T 17/222 |
| | | | 141/69 |
| 7,273,062 B1 | * | 9/2007 | Stender, Jr. ............. F16K 17/32 |
| | | | 137/460 |
| 8,463,462 B2 | | 6/2013 | Cahill |
| 8,683,857 B2 | | 4/2014 | Cahill |
| 9,387,840 B1 | | 7/2016 | Cahill et al. |
| 2002/0057012 A1 | | 5/2002 | Bourguet et al. |
| 2006/0192426 A1 | | 8/2006 | Baechle et al. |
| 2007/0095422 A1 | | 5/2007 | Petty |
| 2012/0085601 A1 | | 4/2012 | Oyama et al. |
| 2012/0223572 A1 | | 9/2012 | Frank |
| 2021/0131459 A1 | * | 5/2021 | Weickel ............... F15B 19/005 |

OTHER PUBLICATIONS

Combined Search and Examination report for GB1914918.6, dated Apr. 9, 2020, 4 pages.

\* cited by examiner

METHOD OF REMOVING HYDRAULIC FLUID FROM AN AIRCRAFT HYDRAULIC SYSTEM, AN AIRCRAFT HYDRAULIC SYSTEM, AND AN AIRCRAFT

CROSS REFERENCE TO RELATED APPLICATIONS

The present application is a National Phase of International Application Number PCT/EP2020/078529 filed Oct. 12, 2020, which designated the U.S. and claims priority benefits from Great Britain Patent Application Number GB1914918.6, filed Oct. 15, 2019, and Great Britain Patent Application Number GB2003960.8, filed Mar. 19, 2020, the entire contents of each of which are hereby incorporated by reference.

FIELD OF THE INVENTION

The present invention concerns a method of removing hydraulic fluid from an aircraft hydraulic system, an aircraft hydraulic system, and an aircraft. More particularly, but not exclusively, the invention concerns removing hydraulic fluid from an aircraft hydraulic system which includes a hydraulic fuse to mitigate unwanted loss of hydraulic fluid. The invention is particularly, but not exclusively, applicable to hydraulic braking systems for aircraft landing gear.

BACKGROUND OF THE INVENTION

It is often desirable to remove hydraulic fluid from an aircraft hydraulic system, to flush and replace the hydraulic fluid, or to bleed a hydraulic braking system to remove air in the hydraulic fluid, for example. Conventionally this is done manually by a human operator. This is time-consuming, and can also lead to inadvertent system effects such as closure of hydraulic fuses (as discussed in detail below), requiring more complex maintenance and potentially removal and replacement of parts.

It would be advantageous to be able to automate or partially automate the removal of hydraulic fluid from aircraft hydraulic system. However, it is undesirable to require additional components in order to do so, particularly in the context of aircraft and landing gear in particular, for which the additional weight and space required by additional components can be disadvantageous.

The present invention seeks to mitigate the above-mentioned problems. Alternatively or additionally, the present invention seeks to provide improved methods of removing hydraulic fluid from an aircraft hydraulic system, aircraft maintenance systems, and an aircraft.

SUMMARY OF THE INVENTION

In accordance with a first aspect of the invention, there is provided a method of removing hydraulic fluid from an aircraft hydraulic system, wherein the hydraulic system comprises:
  an electrohydraulic servo valve connected to a fluid path of hydraulic fluid;
  a hydraulically actuated mechanism connected to the fluid path, arranged to be actuated when a force is applied to the hydraulic fluid by the electrohydraulic servo valve;
  a hydraulic fluid port through which, when opened, the hydraulic fluid can escape from the hydraulic system;
  a hydraulic fuse in the fluid path between the electrohydraulic servo valve and the hydraulic fluid port, arranged to move towards a closed state in which hydraulic fluid cannot pass when the fluid pressure differential across the hydraulic fuse is above a closing threshold, and to move towards an open state in which hydraulic fluid can pass when the fluid pressure differential across the hydraulic fuse is below an opening threshold;
the method comprising the steps of:
  opening the hydraulic fluid port;
  controlling the activation of the electrohydraulic servo valve to force hydraulic fluid to escape from the hydraulic system via the hydraulic fluid port, wherein the electrohydraulic servo valve is controlled so that the hydraulic fuse does not enter and remain in the closed state.

While the electrohydraulic servo valve is activated and the hydraulic fluid port is open, this will cause hydraulic fluid to escape from the hydraulic fluid port. However, this will also create a fluid pressure differential across the hydraulic fuse, causing the hydraulic fuse to move to its closed state to prevent any further hydraulic fluid escaping. By controlling the activation of the electrohydraulic servo valve in such a way that the hydraulic fuse does not enter and remain in the closed state, the process of removing hydraulic fluid from the hydraulic system can be automated, so does not suffer from the disadvantages manual removal by a user involves. This can advantageously be done using the existing components of the hydraulic system.

It will be appreciated that the opening threshold of the hydraulic fuse will be the same as or lower than its closing threshold.

Advantageously, the electrohydraulic servo valve has a maximum activation level, and in the activating step, the electrohydraulic servo valve is activated at a level below the maximum activation level. The maximum activation level may be 40 mA and the activation level used 20 mA, for example. While this will reduce the speed at which hydraulic fluid is removed from aircraft hydraulic system while the hydraulic fuse is in an open state, as the electrohydraulic servo valve will act as a restrictor on the rate at which the hydraulic fluid can flow and so escape, it will also reduce the speed at which the hydraulic fuse moves to the closed state. Further, the electrohydraulic servo valve may be activated at a level that prevents the hydraulic fuse from ever moving fully to the closed state, for example a level that results in a pressure differential across the hydraulic fuse that is lower than its closing threshold. The activation level used may be a predetermined and/or fixed level or may be a level that varies over time.

Advantageously, the step of controlling the activation of the electrohydraulic servo valve comprises the substeps of:
  activating the electrohydraulic servo valve for a first time period to force hydraulic fluid to escape from the hydraulic system via the hydraulic fluid port;
  deactivating the electrohydraulic servo valve for a second time period, to allow the fluid pressure differential across the hydraulic fuse to fall below the opening threshold;
  repeating the activating and deactivating steps a desired number of times. In this way, the hydraulic fuse is prevented from moving fully to the closed state, as while when the electrohydraulic servo valve is activated the hydraulic fuse will more towards the closed state, before it reaches the closed state the electrohydraulic servo valve is deactivated, allow the fluid pressure differential across the hydraulic fuse to fall below the opening threshold, so causing the hydraulic fuse to more back towards the open state. Alternatively, if the hydraulic fuse does fully enter the closed state, the second period during which the electrohydraulic servo valve is deactivated will allow it to move back towards the open state.

The desired number of times may be a predetermined number of times calculated and/or determined from a test system, or it may be determined from the properties of the system, for example using sensors, that the desired number of times has been reached. The desired number of times may be a sufficient number of times to have removed all or a desired proportion of hydraulic fluid from the hydraulic system, with a required likelihood where the number is predetermined.

Where the electrohydraulic servo valve is activated at a level below the maximum activation level as well as being alternately activated and deactivated, this can allow more hydraulic fluid to pass before the closed state occurs and reduce the number of times the electrohydraulic servo valve is deactivated to allow the hydraulic fuse to move from the closed state to the open state, and so can be optimally set to reduce the overall time required to remove the hydraulic fluid.

Advantageously the fluid pressure differential across the hydraulic fuse is above the closing threshold as the hydraulic fluid escapes from the hydraulic system via the hydraulic fluid port. A high fluid pressure differential across the hydraulic fuse is associated with a high flow rate which can reduce the overall time required to remove the hydraulic fluid.

The first time period and second time period may be predetermined time periods. The first time period and second time period may be determined using a test system. The first time period and second time period may be around 5 seconds, for example. The first time period may between 4.9 and 5.1 seconds, or between 4.5 and 5.5 seconds, or between 4 and 5 seconds, for example. The second time period may between 4.9 and 5.1 seconds, or between 4.5 and 5.5 seconds, or between 4 and 5 seconds, for example.

The first time period may end when the hydraulic fuse is in the closed state. It may end as soon as the hydraulic fuse is in the closed state, or a period thereafter. Alternatively, the first time period ends before the hydraulic fuse is in the closed state.

Advantageously, in the activating step, the electrohydraulic servo valve is controlled so that the hydraulic fuse does not enter the closed state.

The second time period may end when the hydraulic fuse is in the open state. It may end as soon as the hydraulic fuse is in the open state, or a period thereafter. Alternatively, the second time period ends before the hydraulic fuse is in the open state. It may end when, or before, the hydraulic fuse is in a fully open state, or a partially open state.

The step of opening the hydraulic fluid port may be performed by a human operator.

Advantageously, the method further comprising the step, following the hydraulic fluid port being opened, of checking that the hydraulic fluid port is open. This may be done by means of a sensor on or near then hydraulic fluid port.

Advantageously, the hydraulic system further comprises a position sensor to determine the position of an internal component of the hydraulic fuse, and the electrohydraulic servo valve is controlled using the output of the position sensor. In this way, the hydraulic system can use the position sensor to directly determine the state of the hydraulic fuse, and activate/deactivate the electrohydraulic servo valve using that so that the hydraulic fuse does not enter and remain in the closed state. Where the electrohydraulic servo valve is activated at a level below the maximum activation level, the output of the position level can be used to determine the level at which to activate the electrohydraulic servo valve. (For example, if it is determined that the hydraulic valve is close to the closed state, the level could be reduced.) Where the electrohydraulic servo valve is activated and deactivated for first and second time periods, the first time period and second time period can be determined using the output of the position sensor, rather than using a predetermined period. The position sensor may be a linear variable differential transducer. The internal component may be a piston or poppet or the like within the hydraulic fuse.

Advantageously, the hydraulic system further comprises an accelerometer to measure the movement of the hydraulic fuse, and the electrohydraulic servo valve is controlled using the output of the position sensor. In this way, the state of the hydraulic fuse can be determined from the accelerator as its vibrations will change as it changes mode. Further, the accelerometer can determine when no hydraulic fluid is passing though the hydraulic fuse even though it is in the open state, so enabling it to be determined when there is no more hydraulic fluid to remove from the hydraulic system. As with the position sensor, the output of the accelerometer can be used to determine the level of activation of the electrohydraulic servo valve and/or the time periods for which it is activated and deactivated.

The first time period may end when the hydraulic fuse is in the closed state. It may end as soon as the hydraulic fuse is in the closed state, or a period thereafter. Alternatively, the first time period ends before the hydraulic fuse is in the closed state.

The second time period may end when the hydraulic fuse is in the open state. It may end as soon as the hydraulic fuse is in the open state, or a period thereafter. Alternatively, the second time period ends before the hydraulic fuse is in the open state. It may end when, or before, the hydraulic fuse is in a fully open state, or a partially open state.

Advantageously, the hydraulically actuated mechanism is a hydraulic brake. In this case, advantageously the hydraulic system is an aircraft landing gear brake system.

In accordance with a second aspect of the invention, there is provided an aircraft hydraulic system arranged to perform any of the methods described above.

In accordance with a third aspect of the invention, there is provided an aircraft comprising an aircraft hydraulic system as described above.

In accordance with a fourth aspect of the invention, there is provided a method of removing hydraulic fluid from an aircraft hydraulic system, wherein the hydraulic system comprises: a fluid path of hydraulic fluid; a hydraulic fluid port through which the hydraulic fluid can escape from the hydraulic system; and a hydraulic fuse in the fluid path, wherein the hydraulic fuse comprises a fuse member configured to move between a shutoff position in which the fuse member prevents the hydraulic fluid from escaping from the hydraulic system via the hydraulic fluid port, and a reset position in which the fuse member does not prevent the hydraulic fluid from escaping from the hydraulic system via the hydraulic fluid port, the method comprising: generating a series of pulses in the hydraulic fluid, wherein each pulse causes hydraulic fluid to escape from the hydraulic system via the hydraulic fluid port, each pulse causes the fuse member to move away from its reset position, and after each pulse the fuse member returns to its reset position.

Advantageously each pulse causes the fuse member to move away from its reset position without reaching its shutoff position.

The fuse member may comprise a piston.

In one embodiment the fuse member is arranged to move towards its shutoff position when a flow rate or fluid pressure differential across the hydraulic fuse is above a closing threshold, and to move towards its reset position when the flow rate or fluid pressure differential across the hydraulic fuse is below an opening threshold, and each pulse causes the flow rate or fluid pressure differential across the hydraulic fuse to rise above the closing threshold so that the fuse member moves away from its reset position. In another embodiment the hydraulic fuse is a volumetric fuse.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which.

DETAILED DESCRIPTION

Figure 1:
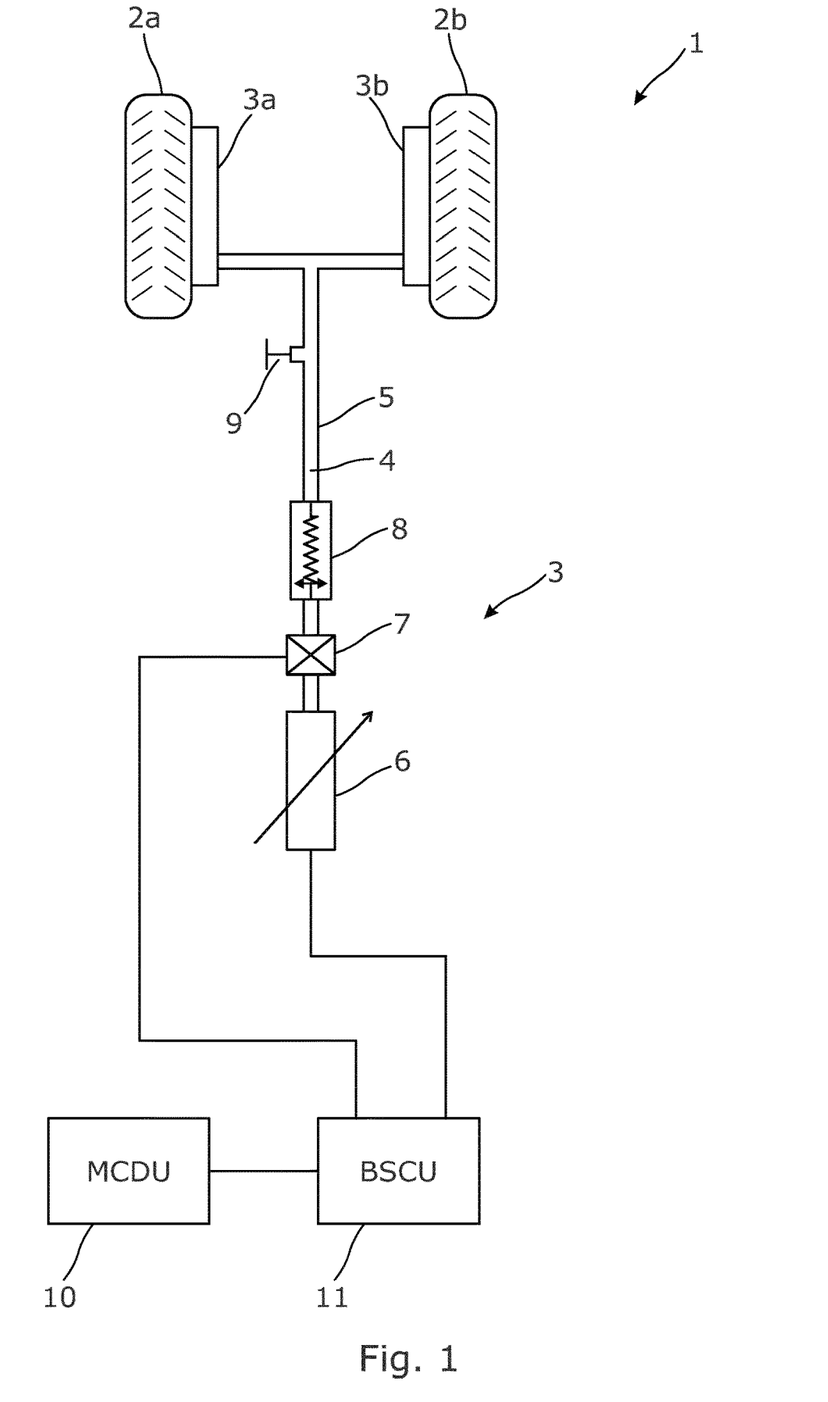
FIG. 1 is a schematic diagram of an aircraft landing gear system in accordance with an embodiment of the invention.

A schematic diagram of an aircraft landing gear system for an aircraft in accordance with an embodiment of the present invention is now described with reference to FIG. 1. The aircraft landing gear system 1 comprises a set of wheels 2a and 2b, which are mounted on a leg (not shown) which is in turn mounted on the underside of the aircraft. The wheels 2a and 2b have respective hydraulic brakes 3a and 3d, which are part of a hydraulic braking system 3.

The hydraulic braking system 3 further comprises hydraulic fluid 4 within a hydraulic hose 5. An end of the hydraulic hose 4 is connected to both hydraulic brakes 3a and 3d, in a T-shaped branch. The other end of the hydraulic hose 5 is connected to an electrohydraulic servo valve 6. The electrohydraulic servo valve 6 can apply a variable pressure to the hydraulic fluid 4, depending on the input current supplied to the electrohydraulic servo valve 6. In the present embodiment, the electrohydraulic servo valve 6 provides a maximum pressure to the hydraulic fluid 4 when supplied with a maximum input current of 40 mA, so when example be supplied with an input current 20 mA will provide a lower pressure to the hydraulic fluid 4.

In the path of the hydraulic hose 5 next to the electrohydraulic servo valve 6 is a selector valve 7, which is a binary on-off valve that can either allow or prevent hydraulic fluid 4 flowing.

In the path of the hydraulic hose 5 next to the selector valve 7, so on the side of the selector valve 7 furthest from the electrohydraulic servo valve 6, is a hydraulic fuse 8. The hydraulic fuse 8 is described in detail below.

Finally, in the path of the hydraulic hose 5 next to the hydraulic fuse 8, so between the hydraulic fuse 8 and the hydraulic brakes 3a and 3d, is a hydraulic fluid port 9, through which the hydraulic fluid 4 can be removed from the hydraulic braking system 3 when the hydraulic fluid port 9 is opened.

The aircraft landing gear system 1 comprises a Braking and Steering Control Unit (BSCU) 11, to which the electrohydraulic servo valve 6 and selector valve 7 are electrically connected so that they can be controlled by the BSCU 11. The BSCU 11 is interfaced with the Multi-Function Control and Display Unit (MCDU) 10 of the aircraft of which the aircraft landing gear system 1 is part, as described in more detail below. The MCDU 10 has a control panel in the cockpit of the aircraft, but is used for maintenance only, and is independent from the cockpit control systems used by the pilots to fly/taxi the aircraft etc.

The hydraulic fuse 8 is now described with reference to FIGS. 2a to 2c, which are cross-sectional views of the hydraulic fuse 8 in different states. The hydraulic fuse 8 is an entirely mechanical device, which is used to mitigate unwanted loss of the hydraulic fluid 4 from the hydraulic braking system 3, for example due to a leak in the hydraulic hose 5.

The hydraulic fuse 8 comprises a body 50, with an inlet port 51, outlet port 52 and a cylindrical internal cavity 53. In the internal cavity 53 there is a movable piston 60 comprising a plug 54, flange 55 and ball 56. A compression spring 57 is in the cavity between the outlet port 52 and cylindrical flange 55, so that the plug 54 passes through the middle of the spring 57, and the spring 54 exerts a force on the flange 55 to push the piston 60 towards the inlet port 51. The diameter of the flange 55 is smaller than the diameter of the cavity 53, so that there is a gap around the circumference of the flange 55.

Figure 2A:
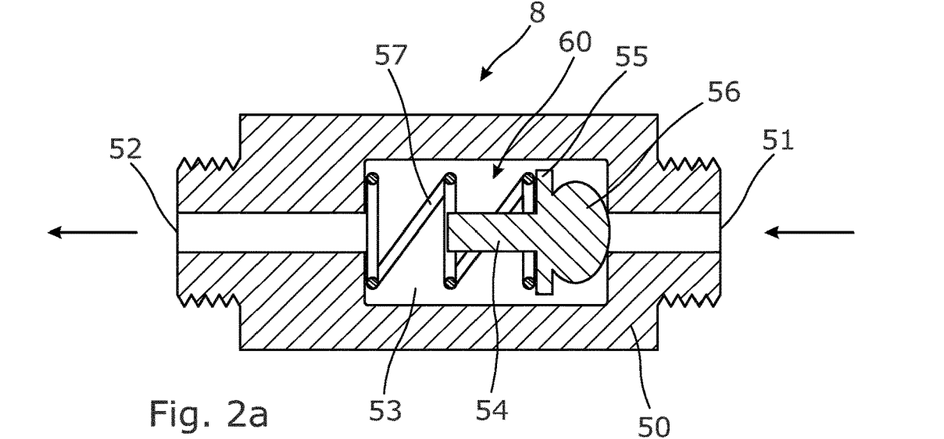
FIG. 2a is a cross-sectional view of the hydraulic fuse shown in FIG. 1 in a fully open state.
Figure 2B:
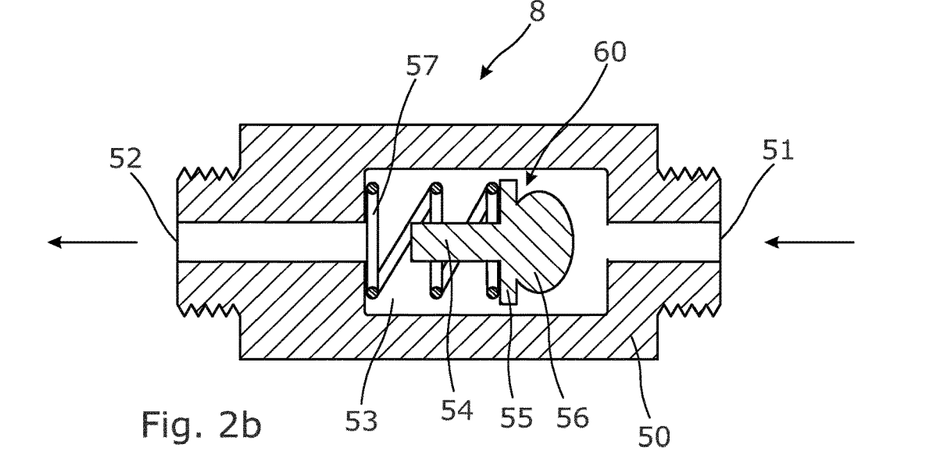
FIG. 2b is a cross-sectional view of the hydraulic fuse shown in FIG. 1 in a partially open state.
Figure 2C:
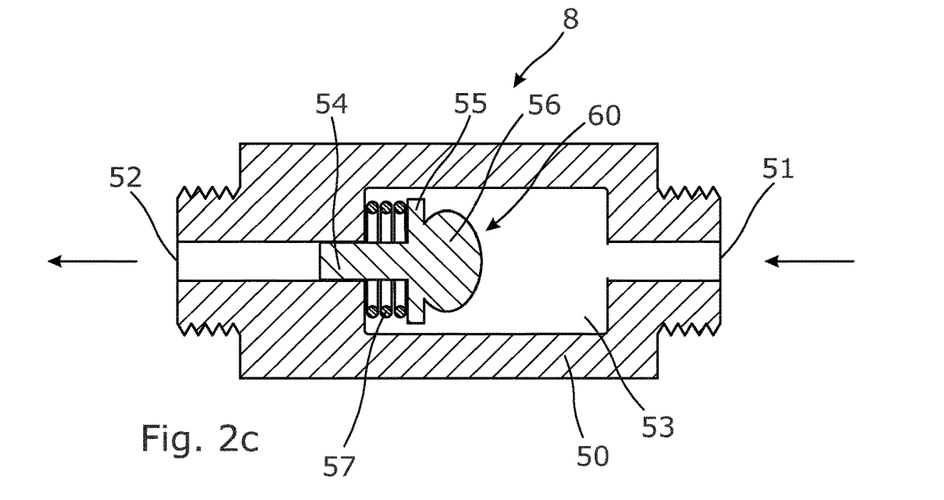
FIG. 2c is a cross-sectional view of the hydraulic fuse shown in FIG. 1 in a closed state.

FIG. 2a shows the hydraulic fuse 8 in a fully open state, which is the state it will be in, or will return to, when there is no pressure differential on the hydraulic fluid 54 across the hydraulic fuse 8, so no pressure being exerted by the hydraulic fluid 54 from either the inlet port 51 or the outlet port 52. In this state, the spring 57 is fully extended, so that the piston 60 is at its closest position to the inlet port 51. When the piston 60 is in this position, the ball 26 of the piston 60 is pushed against the entrance of the inlet port 51 to the cavity 53. So in fact in the fully open state the inlet port 51 is closed by the ball 56, which prevents hydraulic fluid 4 passing from the cavity 53 through the inlet port 51 (i.e. in the wrong direction).

When the hydraulic fuse 8 is in the fully open state with the inlet port 51 closed by the ball 56, a pressure differential on the hydraulic fluid 54 from the inlet port 51 to the outlet port 52 will force the ball 56 away from the inlet port 51, so opening the inlet port 51. This results in the hydraulic fuse being in the partially open state shown in FIG. 2*b*. In this state, the hydraulic fluid 54 passing through the cavity 53 of the hydraulic fuse 8 exerts a force on the piston 60, and in particular the flange 55 thereof, towards the outlet port 52. This force counteracts the force exerted by the spring 57 on the piston 60 towards the inlet port 51. Thus, the piston 60 is moved away from the inlet port 51 towards the outlet port 52, and hydraulic fluid can pass through the hydraulic fuse 8, in particular by passing around the outside of the piston 60 within the cavity 53.

However, when too great a force is exerted by the hydraulic fluid 4 over too great a period of time, the piston 60 will be moved sufficiently far towards the outlet port that the plug 54 of the piston 60 enters the outlet port 52. This results in the hydraulic fuse being in the closed state shown in FIG. 2*c*. In this state, hydraulic fluid 54 is no longer able to pass through the hydraulic fuse 8, as the outlet port 52 is blocked by the plug 54.

In this way, the hydraulic fuse 8 is able to mitigate unwanted loss of the hydraulic fluid 4 from the hydraulic braking system 3, for example due to a leak in the hydraulic hose 5. When a leak or the like occurs, a large pressure differential in the hydraulic fluid 4 will be created across the hydraulic fuse 8, due to the lower pressure caused by the leak. While the hydraulic fluid 4 will initially be able to pass through the hydraulic fuse 8, allowing some to be lost through the leak, the hydraulic fuse 8 will quickly enter the closed state, i.e. with the piston 60 will be moved fully towards the outlet port 52, so that the plug 54 of the piston 60 prevents any more hydraulic fluid 4 being able to pass through the outlet port 52.

As noted above, once there is no longer any pressure differential on the hydraulic fluid 54 across the hydraulic fuse 8, the spring 57 will move the piston 60 back towards the inlet port 51, so automatically returning the hydraulic fuse 8 back to the fully open piston.

Figure 3:
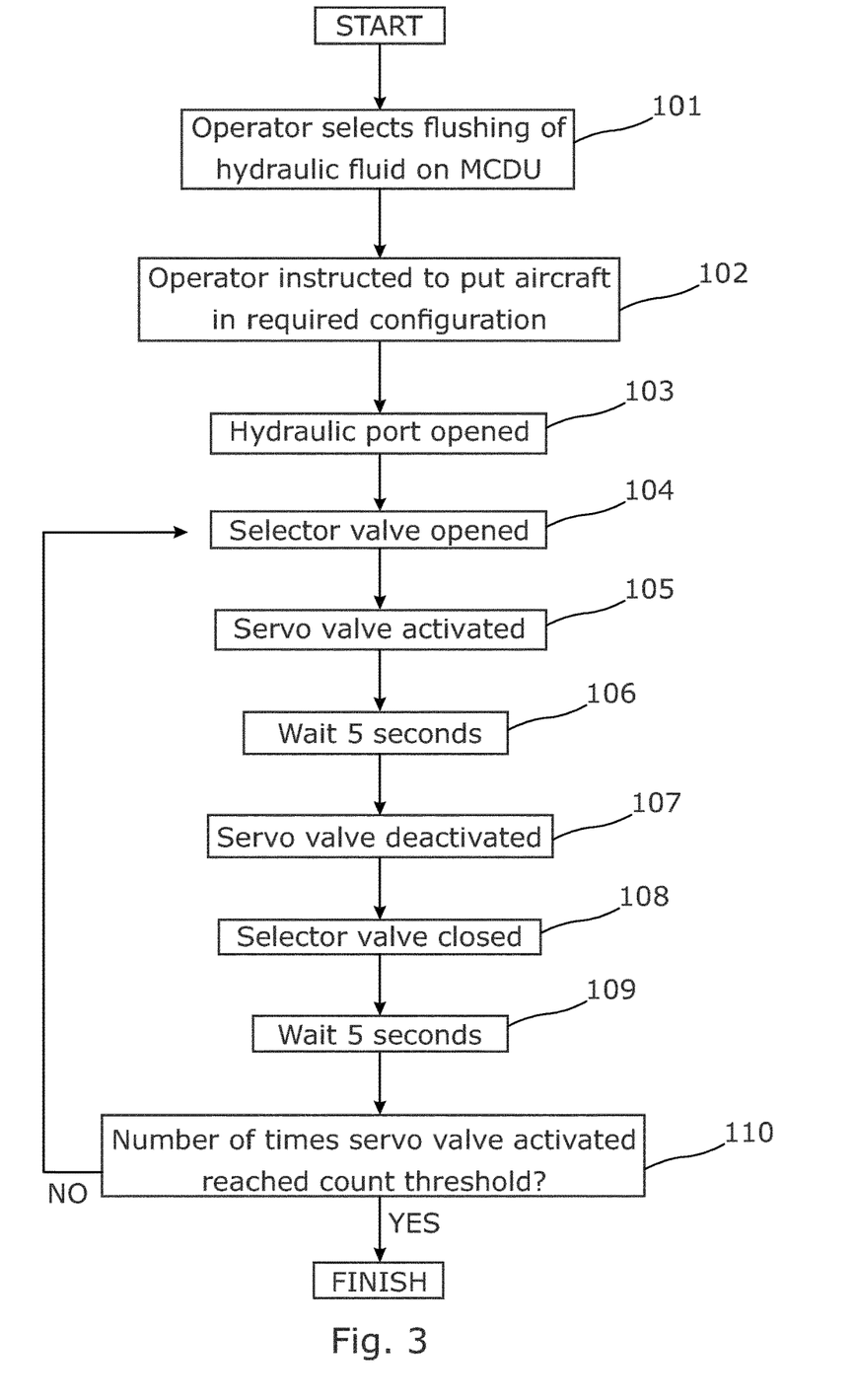
FIG. 3 is a flow chart showing the operation of the aircraft landing gear system of FIG. 1.

The operation of the hydraulic braking system 3 is now described with reference to the flow chart of FIG. 3.

In a first step, a maintenance operator selects on the MCDU 10 that they want the hydraulic fluid 4 to be flushed from the hydraulic braking system 3 (step 101). The MCDU 20 then instructs the operator to put the aircraft in required configuration for this to occur (step 102), including displaying any required safety messages. The hydraulic fluid port 9 is then opened (step 103). This may be done by the operator, and the opening of the hydraulic fluid port 9 may be part of the required configuration instructed by the MCDU 10 in the preceding step 102.

The MCDU 10 then instructs the BCDU 11 to open the selector valve 7 (step 104), and to activate the electrohydraulic servo valve 6 (step 105). The electrohydraulic servo valve 6 is activated by supplying it with an input current of 20 mA, so that it provides a pressure lower than its maximum pressure to the hydraulic fluid 4. This forces hydraulic fluid 2 to escape from the hydraulic braking system 3 via the hydraulic fluid port 9. The hydraulic braking system 3 then waits 5 seconds (step 106).

During the 5-second waiting period, while hydraulic fluid 2 is escaping via the hydraulic fluid port 9 there will of course be a pressure differential across the hydraulic fuse 8. This will cause the hydraulic fuse 8 to move from the fully open state to the partially open state, and depending on the strength of the conditions in the hydraulic braking system 3 and the properties of the hydraulic fuse 8 including in particular the strength of the spring 57, the hydraulic fuse 8 may enter the closed state within the 5-second waiting period.

When the 5-second waiting period has ended, the MCDU 10 instructs the BCDU 11 to deactivate the electrohydraulic servo valve 6 (step 107), and to close the selector valve 7 (step 108). The hydraulic braking system 3 then again waits 5 seconds (step 109). During this time, as there is no longer a pressure differential across the hydraulic fuse 8, it moves back to the fully open state.

The hydraulic braking system 3 then determines if the number of times the electrohydraulic servo valve 6 has been activated has met a threshold (step 110). If the threshold has been met, the process of flushing hydraulic fluid 4 from the hydraulic braking system 3 is complete. If not, step 104 is returned to, and the two 5-second waiting periods are repeated.

In this way, the process of removing the hydraulic fluid 4 from the hydraulic braking system 3 can be automatically performed, by "pulsing" the electrohydraulic servo valve 6 at 5-second intervals, to first force hydraulic fluid 4 from the hydraulic braking system 3 and then to allow the hydraulic fuse 8 to reset.

It will be appreciated that number of times to repeat the two 5-second waiting periods can be calculated and/or predetermined using a test system, so that they are repeated sufficient times for all of the hydraulic fluid 4 to be removed. Further, it will be appreciated that other aspects of operation can be calculated and/or predetermined using a test system to try to give optimal removal of hydraulic fluid 4. For example, it may be determined that a current other than 20 mA is desirable and/or that one or both of the waiting periods is for a period other than 5 seconds.

Figure 4:
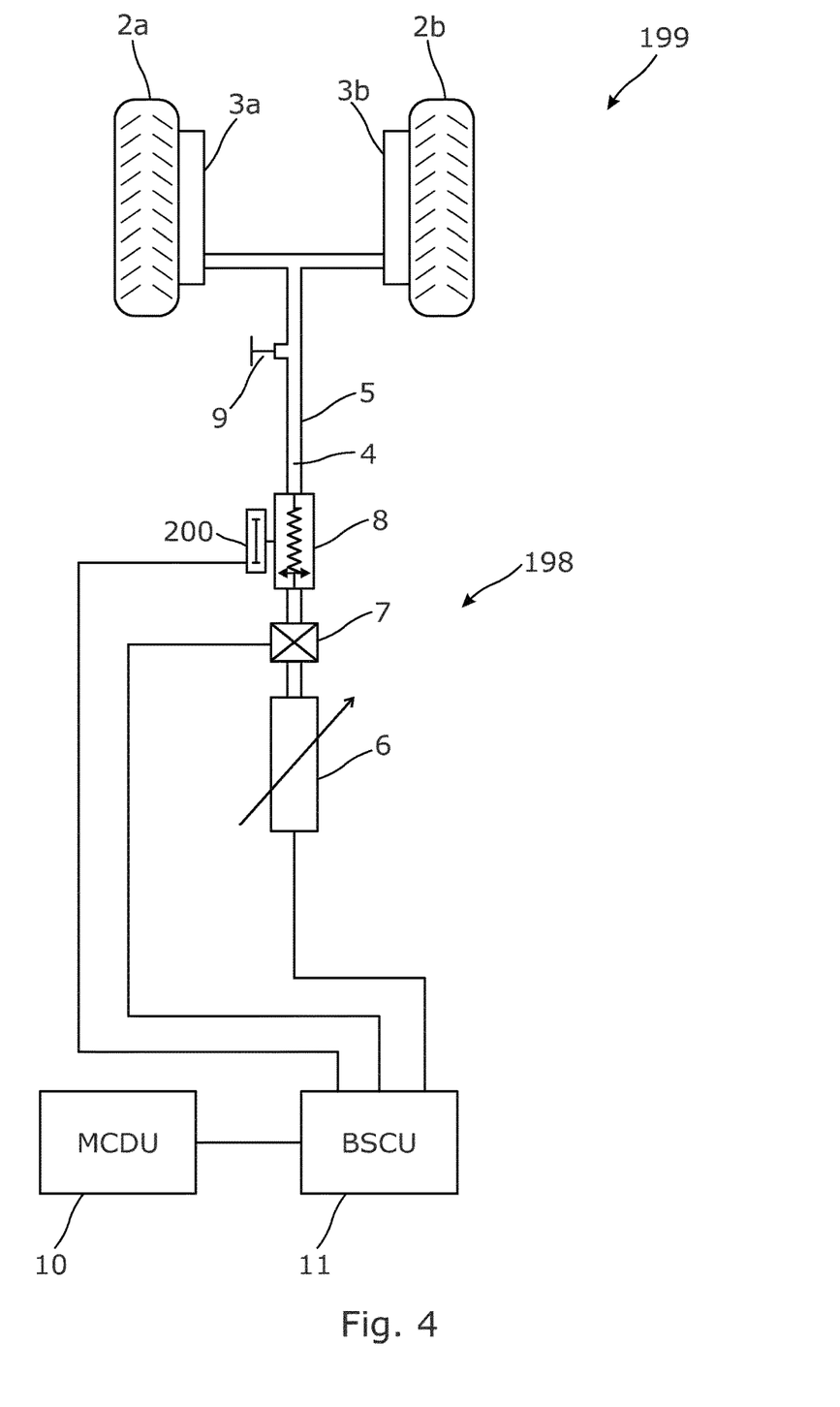
FIG. 4 is a schematic diagram of an aircraft landing gear system in accordance with another embodiment of the invention.

A schematic diagram of an aircraft landing gear system for an aircraft in accordance with another embodiment of the present invention is applicable is shown in FIG. 4. The aircraft landing gear system 199 is very similar to the aircraft landing gear system 1 of the previous embodiment, except that the hydraulic braking system 198 of the present embodiment comprises a position sensor 200 connected to the BSCU 11, arranged to measure the position of the piston 60 of the hydraulic fuse 8. The position sensor 200 is a linear variable differential transducer, but it will be appreciated that in other embodiments of the invention, other types of position sensor could be used.

Figure 5:
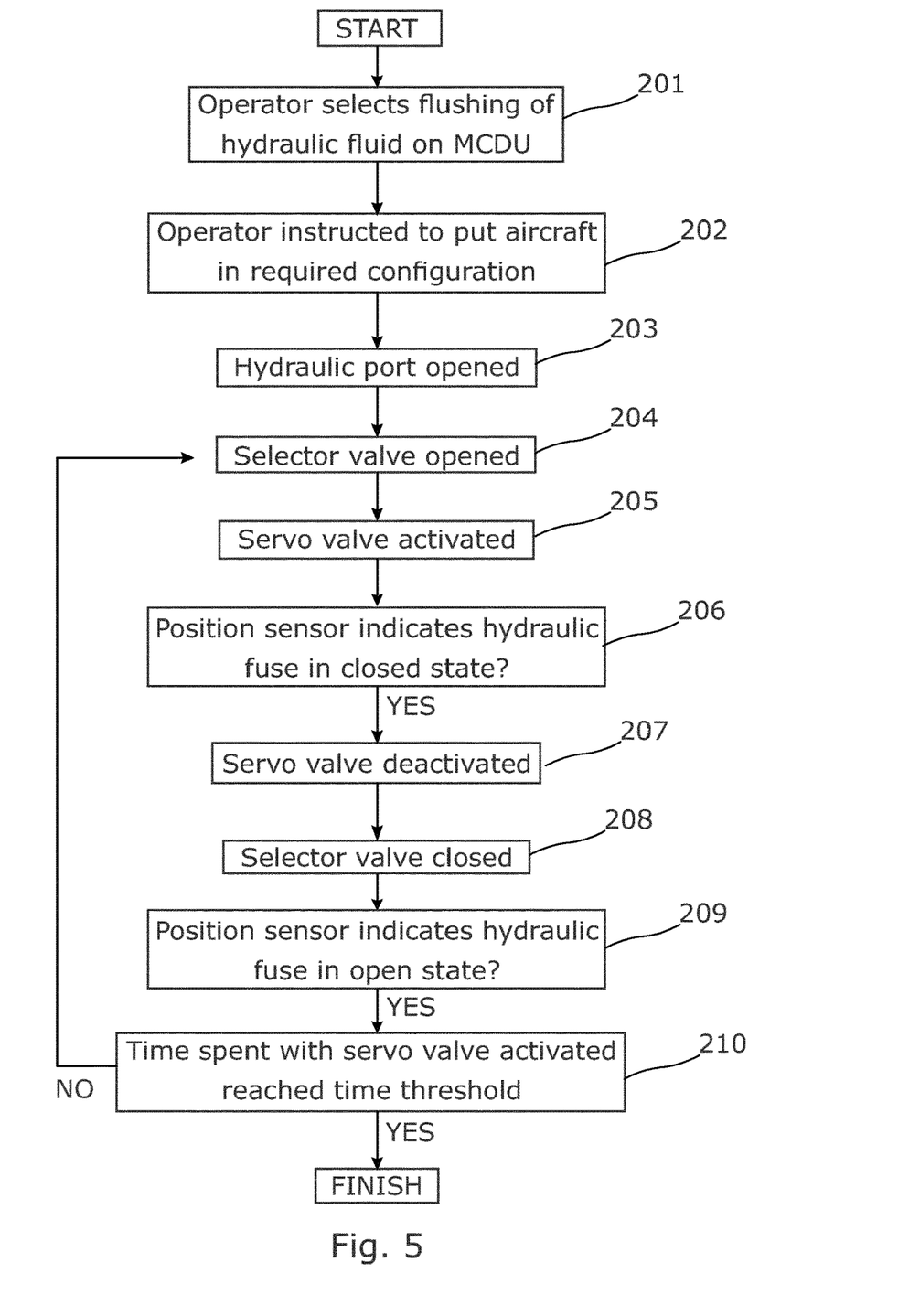
FIG. 5 is a flow chart showing the operation of the aircraft landing gear system of FIG. 4.

The operation of the hydraulic braking system 198 is now described with reference to the flow chart of FIG. 5.

Similarly to the previous embodiment, in a first step a maintenance operator selects to flush the hydraulic fluid 4 to be flushed from the hydraulic braking system 3 (step 201), the MCDU 20 instructs the operator to put the aircraft in required configuration (step 202), and the hydraulic fluid port 9 is opened (step 203). The selector valve 7 is then opened by the BSCU 11 (step 204) and the electrohydraulic servo valve 6 is activated (step 205), again forcing hydraulic fluid 2 to escape from the hydraulic braking system 3 via the hydraulic fluid port 9.

However, in contrast to the previous embodiment, in the present embodiment instead of the electrohydraulic servo valve 6 simply being activated for a predetermined period of time such as 5 seconds, instead the position sensor 200 is used by the BSCU 11 to determine when the hydraulic fuse 8 has moved to the closed state (step 206), i.e. the piston 60 has moved to block the outlet port 52. Once this has occurred, again as in the previous embodiment the electrohydraulic servo valve 6 is deactivated (step 207) and the selector valve 7 is closed (step 208). Again in contrast to the previous embodiment, the hydraulic braking system 198 then again use the position sensor 200 to determine when the hydraulic fuse 8 has moved back to the fully open state (step 209).

Finally, the braking system 198 then determines if the number of times the electrohydraulic servo valve 6 has been activated has met a threshold (step 210), if so the process of flushing hydraulic fluid 4 from the hydraulic braking system 198 is complete, otherwise the step from step 204 onwards are repeated.

Thus, again, the process of removing the hydraulic fluid 4 from the hydraulic braking system 198 can be automatically performed by "pulsing" the electrohydraulic servo valve 6. However, as the state of the hydraulic fuse 8 is being directly sensed by the positon sensor 200, the flushing can be made more efficient, as the activation and/or deactivation of the electrohydraulic servo valve 6 can be initiated when it is measured that the electrohydraulic servo valve 6 is in the desired state, rather than only when it is predicted that it should be based on calculation and/or determination using a test system.

It will again be appreciated that various other aspects of operation can be calculated and/or predetermined using a test system, or in other ways, to try to give optimal removal of hydraulic fluid 4. For example, in the present embodiment, the activation and/or deactivation of the electrohydraulic servo valve 6 could be initiated just before electrohydraulic servo valve 6 moves to the fully open or closed states respectively, rather than when/after those states have actually been reached.

Figure 6:
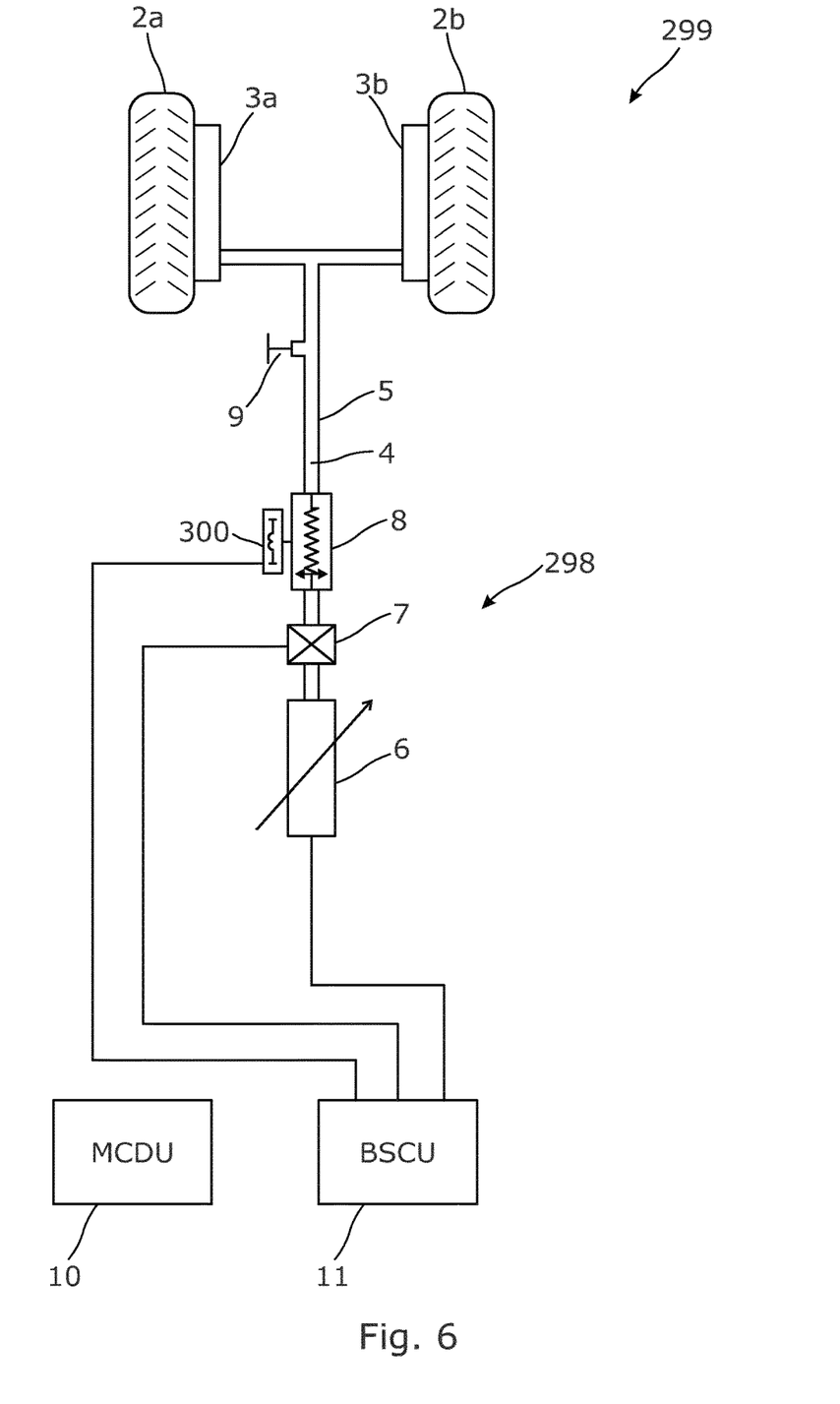
FIG. 6 is a schematic diagram of an aircraft landing gear system in accordance with another embodiment of the invention.

A schematic diagram of an aircraft landing gear system for an aircraft in accordance with another embodiment of the present invention is applicable is shown in FIG. 6. The aircraft landing gear system 299 is very similar to the aircraft landing gear systems of the previous embodiments, except that the hydraulic braking system 298 of the present embodiment comprises an accelerometer 300 connected to the BSCU 11, arranged to measure the movement, particularly vibration, of the hydraulic fuse 8.

Figure 7:
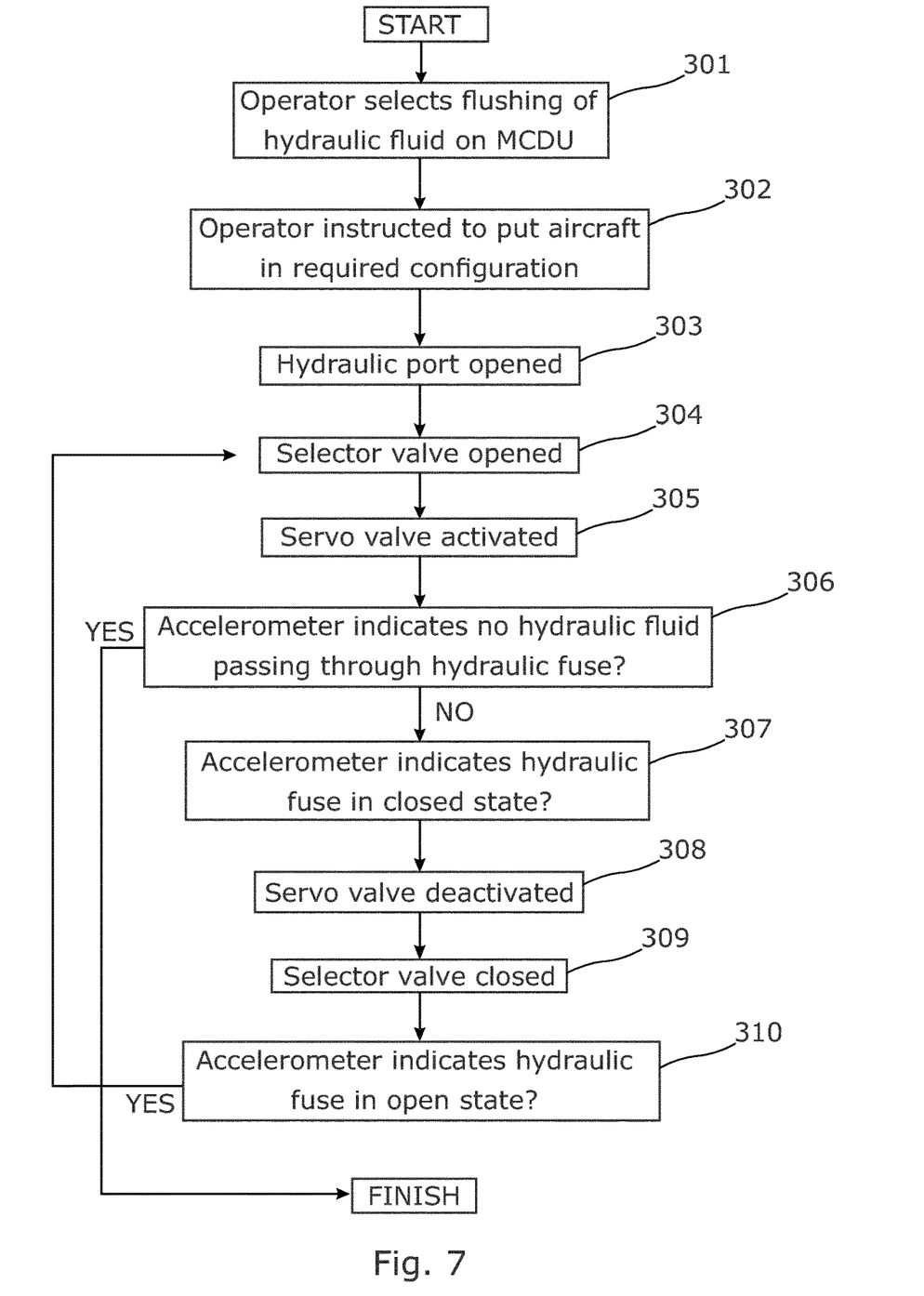
FIG. 7 is a flow chart showing the operation of the aircraft landing gear system of FIG. 6.

The operation of the hydraulic braking system 298 is now described with reference to the flow chart of FIG. 7 Similarly to the previous embodiments, in a first step a maintenance operator selects to flush the hydraulic fluid 4 to be flushed from the hydraulic braking system 3 (step 301), the MCDU 20 instructs the operator to put the aircraft in required configuration (step 302), and the hydraulic fluid port 9 is opened (step 303). The selector valve 7 is then opened (step 304) and the electrohydraulic servo valve 6 is activated (step 305), again forcing hydraulic fluid 2 to escape from the hydraulic braking system 3 via the hydraulic fluid port 9.

However, in contrast to the previous embodiments, in the present embodiment the accelerometer 300 is then used to determine if any hydraulic fluid 4 is passing through the hydraulic fuse 4 (step 306). If no hydraulic fluid 4 is passing then there must be none left in the hydraulic braking system 298 (or at least, none that can be removed by activating the electrohydraulic servo valve 6), and so the process is finished.

If hydraulic fluid 4 is initially passing thought the hydraulic fuse 4, the accelerometer 300 is used to determine when the hydraulic fuse 8 has moved to the closed state (step 307). This will be determined from the changes in the vibration of the hydraulic fuse 8 due to the movement of the hydraulic fluid 4 within it, as the piston 60 moves within the cavity 53 of the hydraulic fuse 8 to eventually block the outlet valve 52.

Once the hydraulic fuse 8 has moved to the closed state, again as in the previous embodiments the electrohydraulic servo valve 6 is deactivated (step 308) and the selector valve 7 is closed (step 309). The accelerometer 300 is then used to determine when the hydraulic fuse 8 has moved back to the fully open state (step 310), and when that occurs the steps from step 304 onwards are repeated.

Thus, again, the process of removing the hydraulic fluid 4 from the hydraulic braking system 298 can be automatically performed by "pulsing" the electrohydraulic servo valve 6. However, in this case the accelerometer 300 can be used to directly sense the state of the hydraulic fuse 8, and also when all of the hydraulic fluid 4 has been removed.

It will again be appreciated that various other aspects of operation can be calculated and/or predetermined using a test system, or in other ways, to try to give optimal removal of hydraulic fluid 4, for example again the activation and/or deactivation of the electrohydraulic servo valve 6 could be initiated just before electrohydraulic servo valve 6 moves to the fully open or closed states respectively, rather than when/after those states have actually been reached.

Figure 8:
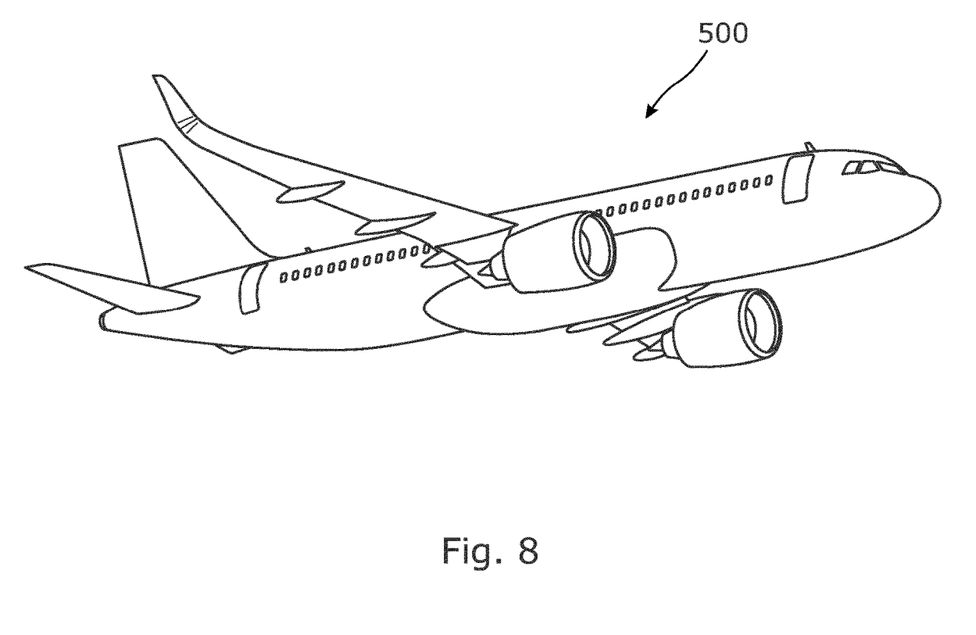
FIG. 8 is a perspective view of an aircraft comprising the aircraft landing gear system of an embodiment of the invention.

FIG. 8 is a perspective view of an aircraft in accordance with an embodiment of the invention. The aircraft 500 comprises an aircraft landing gear system an embodiment described above.

Figure 9:
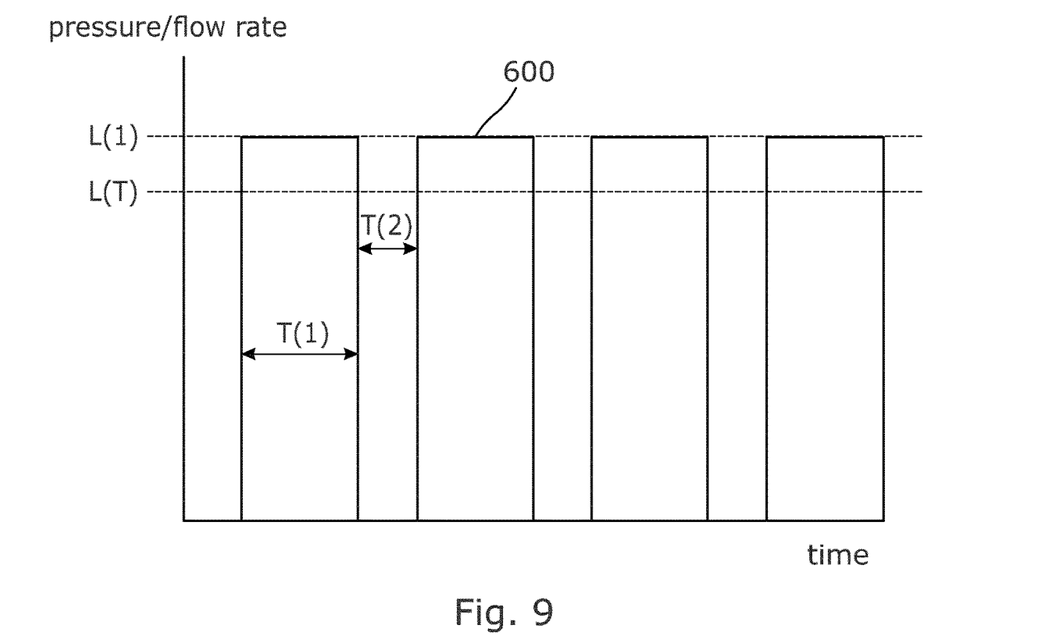
FIG. 9 is a graph showing a first series of pressure pulses.

As described above, the servo valve 6 is controlled so that it carries out a repeating series of activating and deactivating steps. FIG. 9 is a graph showing a series of pressure pulses 600, each pulse 600 corresponding with an activating step and the gap between each adjacent pair of pulses 600 corresponding with a deactivating step. The Y-axis of FIG. 9 indicates the fluid pressure differential across the hydraulic fuse 8, or equivalently the flow rate through the hydraulic fuse 8.

The hydraulic fuse comprises a piston 60 configured to move between a shutoff position (shown in FIG. 2c) in which the piston 60 prevents the hydraulic fluid from escaping from the hydraulic system via the hydraulic fluid port 9, and a reset position (shown in FIG. 2a) in which the piston 60 does not prevent the hydraulic fluid from escaping from the hydraulic system via the hydraulic fluid port 9.

Each pulse 600 causes hydraulic fluid to escape from the hydraulic system via the hydraulic fluid port 9. Each pulse 600 also causes the piston 60 to move away from its reset position, and during the deactivating step after each pulse 60 the piston 60 returns to its reset position.

Figure 10:
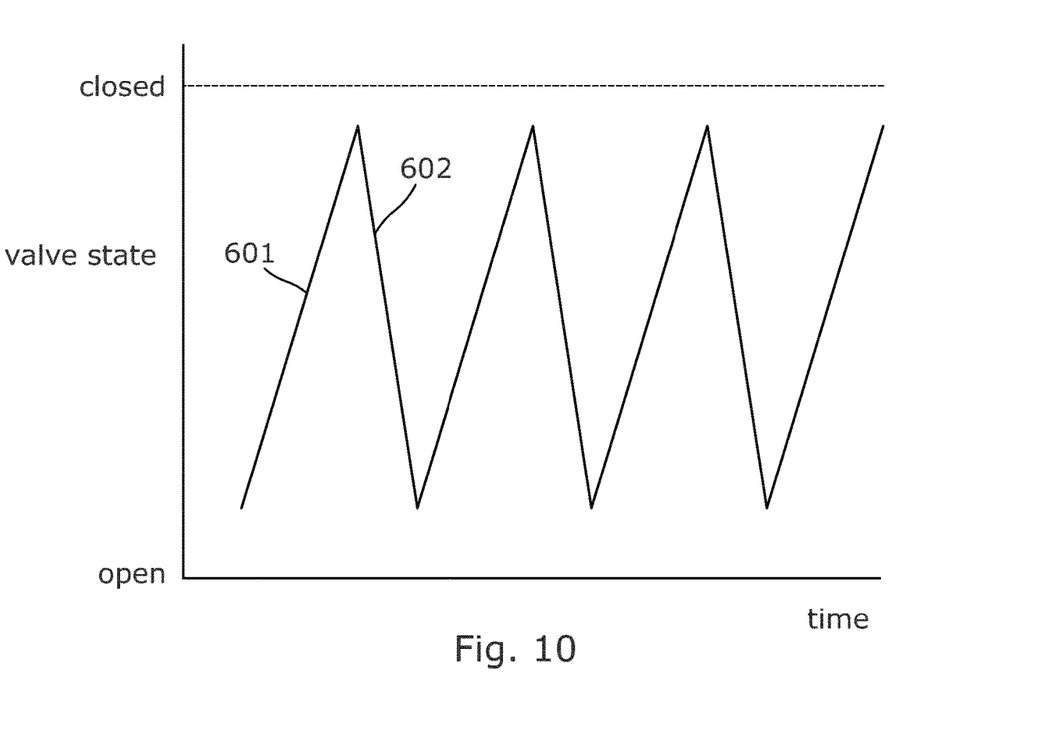
FIG. 10 is a graph showing motion of the piston during the pressure pulses of FIG. 9.

FIG. 10 shows the motion of the piston 60 corresponding with the series of pulses 600 shown in FIG. 9. During each pulse 600 the piston moves towards its shutoff position as indicated at 601 since the fluid pressure differential across the hydraulic fuse is above the closing threshold. The fluid pressure differential during each pulse 600 has a level L(1) which is above the closing threshold L(T). Therefore the fluid pressure differential across the hydraulic fuse 8 is above the closing threshold L(T) as the hydraulic fluid escapes from the hydraulic system via the hydraulic fluid port 9.

As shown in FIG. 10, each pulse causes the piston 60 to move away from its reset position without reaching its shutoff position. In other words, in the activating step corresponding with each pulse 600, the electrohydraulic servo valve 6 is controlled so that the hydraulic fuse 8 does not enter the closed state. This is beneficial because if the piston 60 reaches the shutoff position (corresponding with the closed state of FIG. 2c) then it may become locked in place and difficult to force back to its reset position. Ideally the piston 60 moves as close as possible to its shutoff position, without reaching it.

The speed of the motion 601 of the piston in the activating step is dependent on characteristics of the hydraulic fuse 8 (for instance the stiffness of the spring 57) and the size of the fluid pressure differential across the hydraulic fuse 8—higher fluid pressure being associated with a higher speed.

At the end of each pulse 600 the fluid pressure differential across the hydraulic fuse 8 drops below an opening threshold, and this causes the piston to be forced back to its reset position by the spring 57. In this case the opening threshold is the same as the closing threshold L(T).

The speed of the motion 602 of the piston in each deactivating step is also dependent on characteristics of the hydraulic fuse 8 (for instance the stiffness of the spring 57). In the case of FIGS. 9 and 10, the speed is higher during the deactivating step than during the activating step, so the first time period T(1) of each pulse 600 is longer than the second time period T(2) between pulses.

Figure 11:
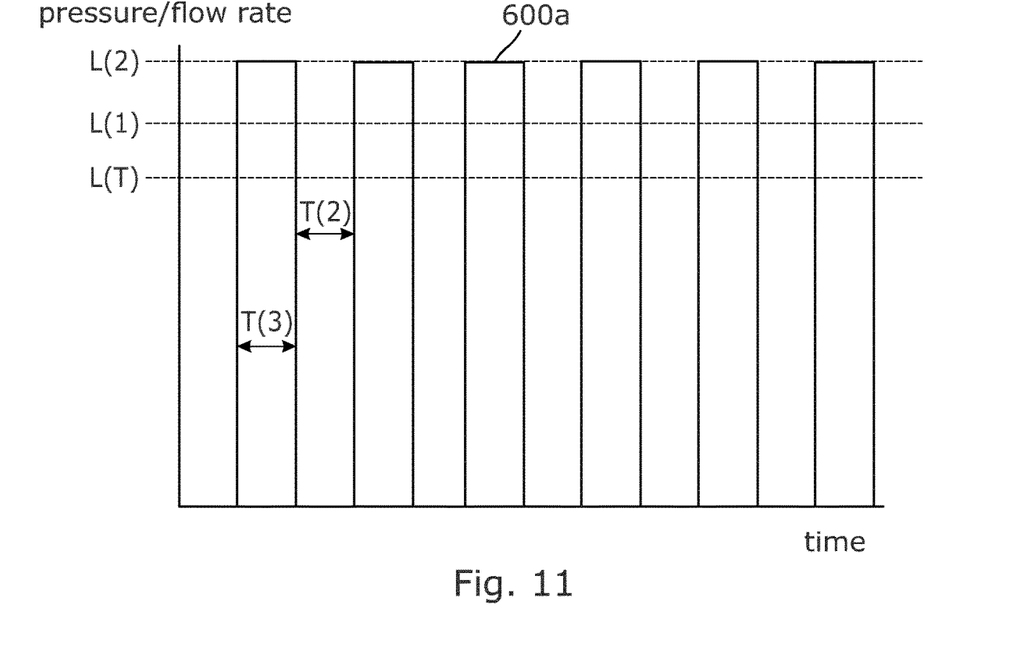
FIG. 11 is a graph showing a second series of pressure pulses.

FIG. 11 is a graph showing a series of pressure pulses 600a, each pulse 600a corresponding with an activating step and the gap between each adjacent pair of pulses 600a corresponding with a deactivating step. The pulses 600a in FIG. 11 have a higher pressure level (L(2)) than the pulses 600 in FIG. 9. The time T(2) between the pulses 600a is the same as in the pulse sequence of FIG. 9.

Figure 12:
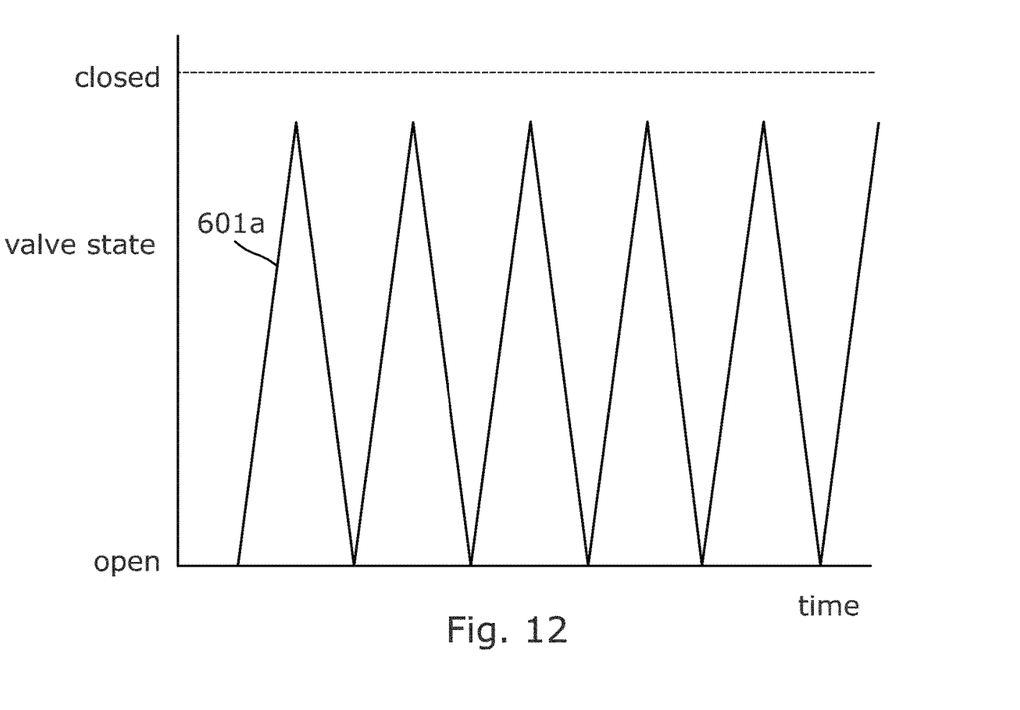
FIG. 12 is a graph showing motion of the piston during the pressure pulses of FIG. 11.

As shown in FIG. 12, the speed of the motion 601a of the piston in the activating step is higher than in FIG. 10, because the pressure differential (and associated flow rate) is higher. For this reason the first time period T(3) is shorter so that the hydraulic fuse 8 does not enter the closed state. In this case the first time period T(3) for each pulse 600a is about the same as the second time period T(2) between pulses.

By comparing FIGS. 9 and 10 it can be seen that the selection of an optimal pressure level (that is, a pressure level which minimizes the overall time required to remove the hydraulic fluid) involves a trade-off between a high pressure level and a long first time period for each pulse. In other words, the higher the pressure level the higher the flow rate out of the hydraulic fluid port 9, but the hydraulic fuse 8 must also be reset more frequently. The optimal pressure level, first time period and second time period may be determined by laboratory testing and stored in a computer memory which is part of the BSCU 11.

Although a very high pressure may not minimize the overall time required to remove the hydraulic fluid (due to the need for frequent resetting of the hydraulic fuse) it may nevertheless be beneficial because the higher flow rate will excite or energise air bubbles and reduce the risk of such air bubbles remaining trapped in the hydraulic system.

In the embodiments described above, the hydraulic fuse 8 is a rate fuse or pressure fuse. In other words, the piston is arranged to move towards its shutoff position when a flow rate or fluid pressure differential across the hydraulic fuse is above a closing threshold, and to move towards its reset position when the flow rate or fluid pressure differential across the hydraulic fuse is below an opening threshold. In an alternative embodiment of the invention, the hydraulic fuse 8 may be replaced by a volumetric fuse, which enters a closed state when a threshold volume of hydraulic fluid has flowed through the fuse.

An example of such a volumetric fuse is described in US5507466, the contents of which are incorporated herein by reference. A piston moves between a reset position and a closed position. As the piston moves towards the closed position it forces hydraulic fluid out of the hydraulic system via the hydraulic fluid port 9. As the piston retracts back to the reset position it sucks further hydraulic fluid into the hydraulic line via a recharge line (not shown) between the volumetric fuse and the hydraulic fluid port 9.

While the present invention has been described and illustrated with reference to particular embodiments, it will be appreciated by those of ordinary skill in the art that the invention lends itself to many different variations not specifically illustrated herein.

For example, in other embodiments of the invention the electrohydraulic servo valve may not be deactivated during the removal of hydraulic fluid, but instead continuously activated but at a level low enough that the hydraulic fuse does not enter the closed state (or does not move towards the closed state at all), or the electrohydraulic servo valve may be continuously activated but at a level that is varied so that the hydraulic fuse is nevertheless for periods of time able to move towards the fully open state, either to allow it to move from being in the closed state, or to prevent it from entering the closed state at all.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of removing hydraulic fluid from an aircraft hydraulic system, wherein the hydraulic system comprises:
    an electrohydraulic servo valve connected to a fluid path of hydraulic fluid;
    a hydraulically actuated mechanism connected to the fluid path, arranged to be actuated when a force is applied to the hydraulic fluid by the electrohydraulic servo valve;
    a hydraulic fluid port through which, when opened, the hydraulic fluid can escape from the hydraulic system;
    a hydraulic fuse in the fluid path between the electrohydraulic servo valve and the hydraulic fluid port, arranged to move towards a closed state in which the hydraulic fluid cannot pass when a fluid pressure differential across the hydraulic fuse is above a closing threshold, and to move towards an open state in which the hydraulic fluid can pass when a fluid pressure differential across the hydraulic fuse is below an opening threshold;
    the method comprising the steps of:
    opening the hydraulic fluid port;
    controlling the activation of the electrohydraulic servo valve to force the hydraulic fluid to escape from the hydraulic system via the hydraulic fluid port, wherein the electrohydraulic servo valve is controlled so that the hydraulic fuse does not enter and remain in the closed state.

2. A method as claimed in claim 1, wherein the electrohydraulic servo valve has a maximum activation level, and in the step of controlling the activation of the electrohydraulic servo valve, the electrohydraulic servo valve is activated at a level below the maximum activation level.

3. A method as claimed in claim 1, wherein the step of controlling the activation of the electrohydraulic servo valve comprises the substeps of:
activating the electrohydraulic servo valve for a first time period to force the hydraulic fluid to escape from the hydraulic system via the hydraulic fluid port;
deactivating the electrohydraulic servo valve for a second time period, to allow the fluid pressure differential across the hydraulic fuse to fall below the opening threshold;
repeating the activating and deactivating steps a desired number of times.

4. A method as claimed in claim 3, wherein the first time period and second time period are predetermined time periods.

5. A method as claimed in claim 4, wherein the first time period and second time period are determined using a test system.

6. A method as claimed in claim 3, wherein the first time period ends when the hydraulic fuse is in the closed state.

7. A method as claimed in claim 3, wherein the first time period ends before the hydraulic fuse is in the closed state.

8. A method as claimed in claim 3, wherein the second time period ends when the hydraulic fuse is in the opened state.

9. A method as claimed in claim 3, wherein the first time period is longer than the second time period.

10. A method as claimed in claim 3, wherein during the first time period the electrohydraulic servo valve is activated at a predetermined level.

11. A method as claimed in claim 1, further comprising the step, following the hydraulic fluid port being opened, of checking that the hydraulic fluid port is open.

12. A method as claimed in claim 1, wherein the hydraulic system further comprises a position sensor to determine a position of an internal component of the hydraulic fuse, and the electrohydraulic servo valve is controlled using an output of the position sensor.

13. A method as claimed in claim 1, wherein the hydraulic system further comprises an accelerometer to measure the movement of the hydraulic fuse, and the electrohydraulic servo valve is controlled using the output of the position sensor.

14. A method as claimed in claim 1, wherein the hydraulically actuated mechanism is a hydraulic brake.

15. A method as claimed in claim 14, wherein the hydraulic system is an aircraft landing gear brake system.

16. A method as claimed in claim 1, wherein, in the step of controlling the activation of the electrohydraulic servo valve, the electrohydraulic servo valve is controlled so that the hydraulic fuse does not enter the closed state.

17. A method as claimed in claim 1, wherein the fluid pressure differential across the hydraulic fuse is above the closing threshold as the hydraulic fluid escapes from the hydraulic system via the hydraulic fluid port.

18. An aircraft maintenance system arranged to perform the method of claim 1.

19. An aircraft comprising the aircraft maintenance system as claimed in claim 18.

20. A method of removing hydraulic fluid from an aircraft hydraulic system, wherein the hydraulic system comprises:
a fluid path of hydraulic fluid;
a hydraulic fluid port through which the hydraulic fluid can escape from the hydraulic system; and
a hydraulic fuse in the fluid path, wherein the hydraulic fuse comprises a fuse member configured to move between a shutoff position in which the fuse member prevents the hydraulic fluid from escaping from the hydraulic system via the hydraulic fluid port, and a reset position in which the fuse member does not prevent the hydraulic fluid from escaping from the hydraulic system via the hydraulic fluid port,
the method comprising:
generating a series of pulses in the hydraulic fluid, wherein each pulse causes the hydraulic fluid to escape from the hydraulic system via the hydraulic fluid port, each pulse causes the fuse member to move away from its reset position, and after each pulse the fuse member returns to its reset position.

* * * * *